Dec. 19, 1967 P. PERREAU 3,359,007

MULTIDECK MAGNETIC RECORDING APPARATUS

Filed July 22, 1964 4 Sheets-Sheet 1

Pierre Perreau
INVENTOR.

BY Michael P. Breston
ATTORNEY

MULTIDECK MAGNETIC RECORDING APPARATUS

Filed July 22, 1964 4 Sheets-Sheet 2

Pierre Perreau
INVENTOR.

BY Michael P. Breston

ATTORNEY

Pierre Perreau
INVENTOR.

BY Michael P. Breston
ATTORNEY

Dec. 19, 1967 P. PERREAU 3,359,007

MULTIDECK MAGNETIC RECORDING APPARATUS

Filed July 22, 1964 4 Sheets-Sheet 4

Pierre Perreau
INVENTOR.

BY Michael P Breston
ATTORNEY

3,359,007
MULTIDECK MAGNETIC RECORDING APPARATUS

Pierre Perreau, Paris, France, assignor, by mesne assignments, to Societe d'Instrumentation Schlumberger, Paris, France, a corporation of France Filed July 22, 1964, Ser. No. 384,449
Claims priority, application France, July 25, 1963, 942,733, Patent 1,375,115
6 Claims. (Cl. 274—4)

ABSTRACT OF THE DISCLOSURE

A multi-deck recording apparatus capable of rapid interchange of two or more recordings and simultaneous playback of several recordings. The apparatus includes a plurality of cassettes each mounted for pivotal movement about a common axis on the casing. Each cassette has an eye which allows pivotally connecting the cassette to a pivot when in a first position, allows swinging the cassette downwardly into the chassis to an inactive position in which it is engaged by an actuating device, and from which the cassette is moved by the actuating device to an active position in which an exposed portion of the magnetic tape engages a recording head and a driven roller on the cassette is moved into driving engagement with a drive shaft in the chassis. The magnetic tape rides along an unsupported run of the belt which urges the tape against the recording head. An adjustable member on the cassette permits changing the relationship between the actuating member and the cassette to obtain the most effective positioning of the tape relative to the recording head when the cassette is in the active position with the tape engaging the head.

This invention relates to multideck recording apparatus and, more particularly, to a very versatile multideck recording apparatus especially adapted for use in broadcasting and monitoring stations.

In modern radio broadcasting stations, fast responding and versatile recording and reproducing equipments are needed. It is desirable, for example, to be able to interchange two or more recordings in less than a second and still maintain high fidelity of reproduction. Preferably, a recorder of this type should automatically stop at the end of a tape run. The equipment should also allow for the simultaneous playback of several recordings in order to broadcast them together or to make a composite record.

Accordingly, it is a broad object of this invention to provide a new and improved multideck magnetic recording and reproducing apparatus which fulfills the above and other requirements of modern broadcasting and monitoring stations.

It is another object of this invention to provide a multideck recorder which requires few moving parts, which is rugged, which is economical to manufacture and which requires a minimum of controlling operations.

The above and other objects are accomplished in accordance with this invention by providing a multideck recording and reproducing apparatus which comprises a chassis, a driving shaft rotatably mounted in the chassis, said shaft being driven at a constant speed, a pivot shaft fixedly mounted on the side walls of the chassis, at least one magnetic deck having a casing which is pivotally mounted on the pivot shaft, an idle roller, a driven roller, a spool having a plurality of spindles mounted in the casing, a driving belt coupling the rollers, the belt having a portion thereof outside of the casing, an endless magnetic tape wound around the spindles, the rollers and the portion of said belt, at least one magnetic head mounted on the chassis and disposed adjacent and opposite to the portion of said belt, an engaging device on the casing, and means releasably coupling with said engaging device in response to actuating means.

Other objects and many of the other attendant advantages of this invention will become apparent as the description proceeds with reference to the accompanying drawings wherein like reference characters refer to like parts throughout the several views.

Figure 1:
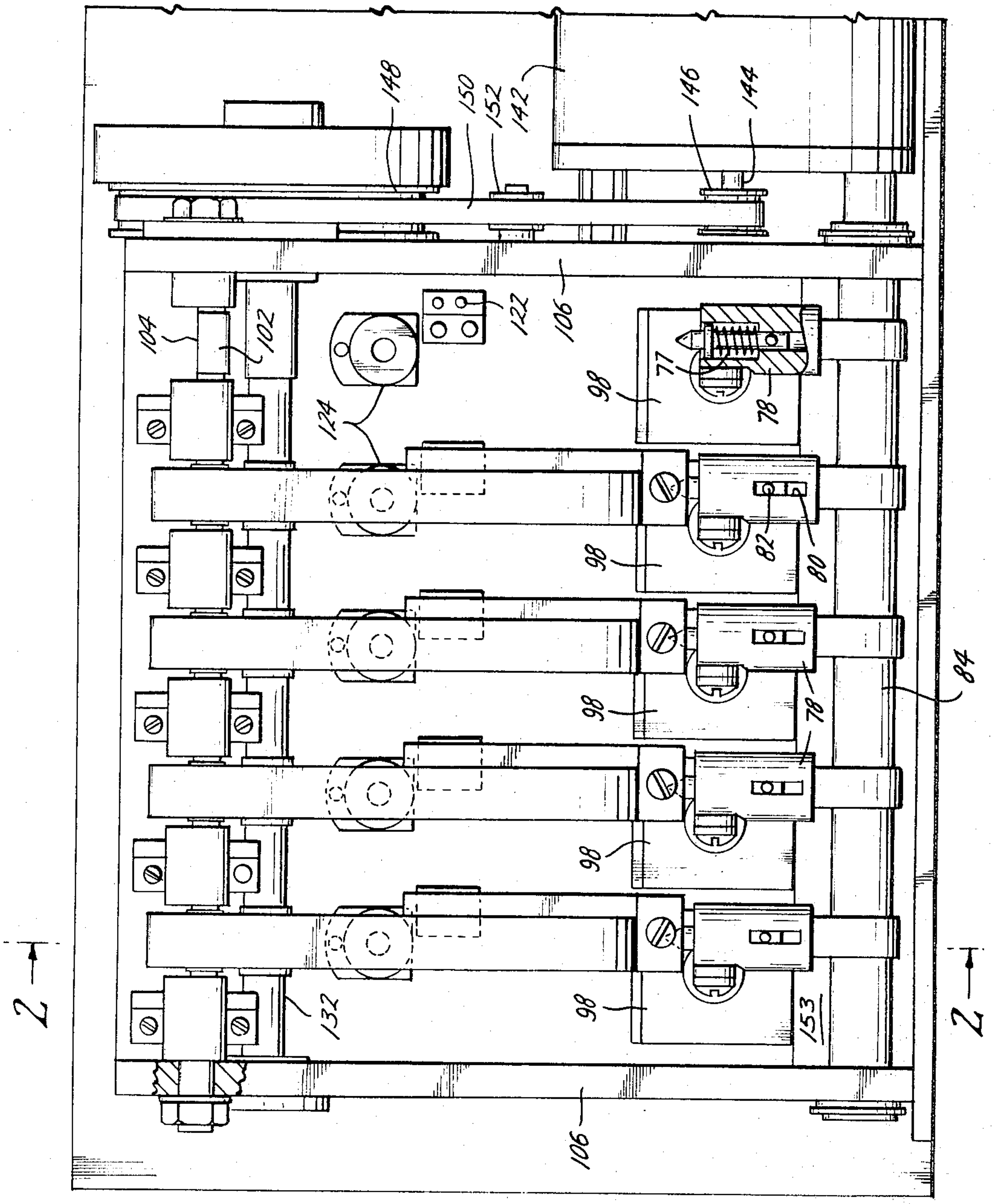
FIGURE 1 is a top view of a five deck recording and reproducing apparatus in accordance with this invention from which one deck is removed.

Referring to the drawings, there is shown a preferred embodiment of a multideck recorder. For convenience, only five decks are shown. Each deck comprises a magnetic cassette having a casing 10. The five casings **10*a*–10*e*** are detachably mounted in a manner which will become clear as the description proceeds. Inasmuch as all casings are identical, only one casing will be described in detail. It will be understood that the construction and the operation of the remaining casings are in all respects identical.

Casing 10 has a side wall 11 and a floor 12. To the floor 12 of casing 10 is fixedly secured by screws, not shown, the lower flange 14 of a spool 16. The upper flange 18 is connected to the lower flange 14 by eight spindles 20. Each spindle has a roller 22 mounted on ball bearings about an axis 23. Around the spindles 20 are wound several turns of an endless, opaque, magnetic tape 24. The tape around the spindles lies in a plane perpendicular to the floor 12. The tape, after making a 90° bend, leaves the interior of the spool 16 through a flat opening 26 formed in the thickness of the lower flange 14. To aid the tape 24 to regain its original vertical position, it is made to pass over a return ramp 28 and over an idle roller 30 mounted on ball bearings about an axis 31 secured to the floor 12. A driven roller 32, preferably provided with a rubber sleeve 34, is also mounted on ball bearings about an axis 35 fixedly secured to the floor 12 of casing 10. An endless belt 36 couples the two rollers 30 and 32. The tape 24 passes over the rollers 30 and 32 and rests against a portion of belt 36 herein called a run 37. Run 37 is outside of casing 10. After leaving the roller 32, tape 24 is made to pass in front of a window 38 in a chamber 40 housing a small electric lamp 41. A second window 42, similar and opposite to window 38, is formed on the same axis in the side wall 11 of casing 10. A small strip of transparent tape connects the two ends of the magnetic tape 24 and makes it endless. After each complete cycle of the magnetic tape 24, the transparent strip passes between the adjacent and oppositely placed windows 38 and 42.

In the upper left hand corner, casing 10 is provided with an interlocking device in the form of a fixing eye 44 defined by ribs 46, 48 and 50. An opening 52 in the casing 10 communicates with the fixing eye 44 to enable the casing 10 to be easily located or removed.

A pivot shaft 102 is fixedly secured between the side walls 106 of a chassis 108 adapted to carry the several decks of the recording equipment. The bottom 110 of chassis 108 is provided with a base 112 to which is fixedly secured a bracket 114 for carrying at least one magnetic head 116, either of the playback or the recording type. Hereinafter, the head 116 will be referred to as a playback head. Two ears 118 fixedly secure the head 116 to the bracket 114. The magnetic playback head 116 bears against the run 37 of the driving belt 36 and, consequently, against the portion of the magnetic tape which is in contact with run 37.

Figure 4:
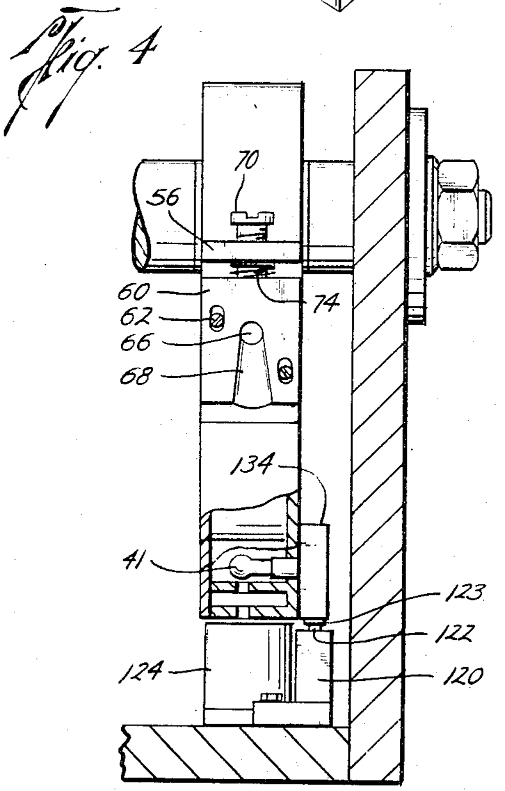
FIGURE 4 is a partial view, partly in cross section, taken along line 4—4 on FIGURE 2.

To the base 112 is also secured an electrical connector 120 provided with two bayonet type pins 122 which make contact with the terminals 123 leading to the lamp 41. Near the connector 120 is mounted on the base 112 a hollow box 124 defining in one side thereof an opening 126 centrally arranged about the axis of the windows 38 and 42. Immediately under the opening 126 is arranged a light responsive element such as a photoelectric cell 128 to which are connected two connector wires 130. Rotatably mounted in the side walls 106 of the chassis 108 is a driving shaft 132 for imparting rotation to the driven roller 32 by maintaining frictional contact therewith. Referring more particularly to FIGURE 4, there is shown a box 124 having the terminals 123 which make contact with the pins 122.

A synchronous electric motor 142 is mounted outside of the chassis 108 and is fixedly secured to the side wall 106. Shaft 144 of motor 142 is provided with a pulley 146. The rotatably mounted shaft 132 is supported by the two side walls 106 of the chassis 108 and is provided with a pulley 148 of high inertia. The pulleys 146 and 148 are interconnected by an endless belt 150 passing over an idler 152.

Figure 5:
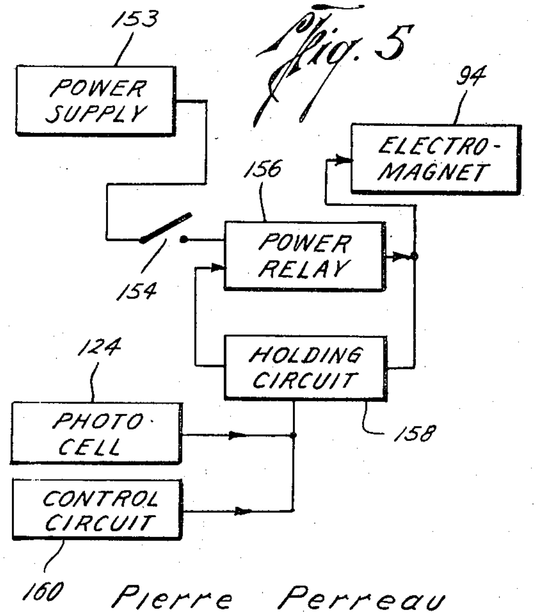
FIGURE 5 is a block diagram of the control circuitry associated with one cassette in the recording and reproducing apparatus of this invention.

FIGURE 5 represents the control circuit, in block diagram form, for the first deck. A push-button-start member 154 connects the outlet of a power supply 153 to the coil of a power relay 156. A holding circuit 158 is provided for the power relay 156. Closure of the power relay 156 energizes the electromagnet 94. The holding circuit 158 can be opened by the illumination of the photoelectric cell 124 and additionally by a control circuit 160 which may also be of the push-button-type. The deenergization of relay 156, of course, stops the operation of the first magnetic deck.

Figure 6:
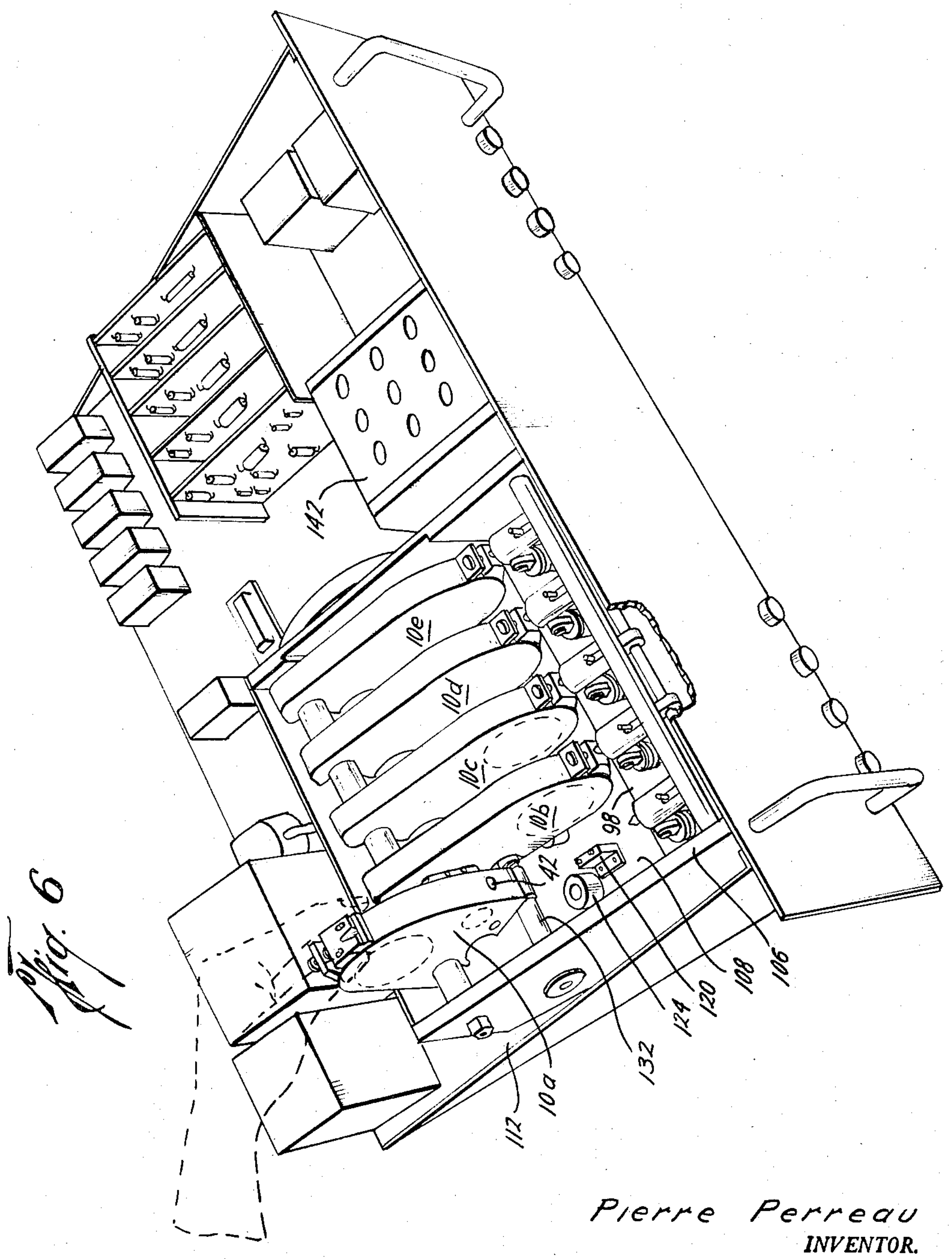
FIGURE 6 is a view in elevation of the entire recording and reproducing apparatus in accordance with this invention.

In operation of the multideck equipment, the motor 142 drives the shaft 132 at constant speed. When it is desired to place on the chassis 108 a magnetic deck, as shown in FIGURE 6 by the dotted hand, the opening 52 of casing 10, which is narrower than the diameter of the pivot shaft but of sufficient width to be passed over flat 104, is engaged on the flat surface 104 of pivot 102, then the casing 10 is rocked around the pivot 102 so that the end of the finger 76 slides up the access ramp 68 and then enters the notch 66. This position of casing 10 is referred to as the inoperative position, i.e., the tape 24 is disengaged from the head 116.

Figure 2:
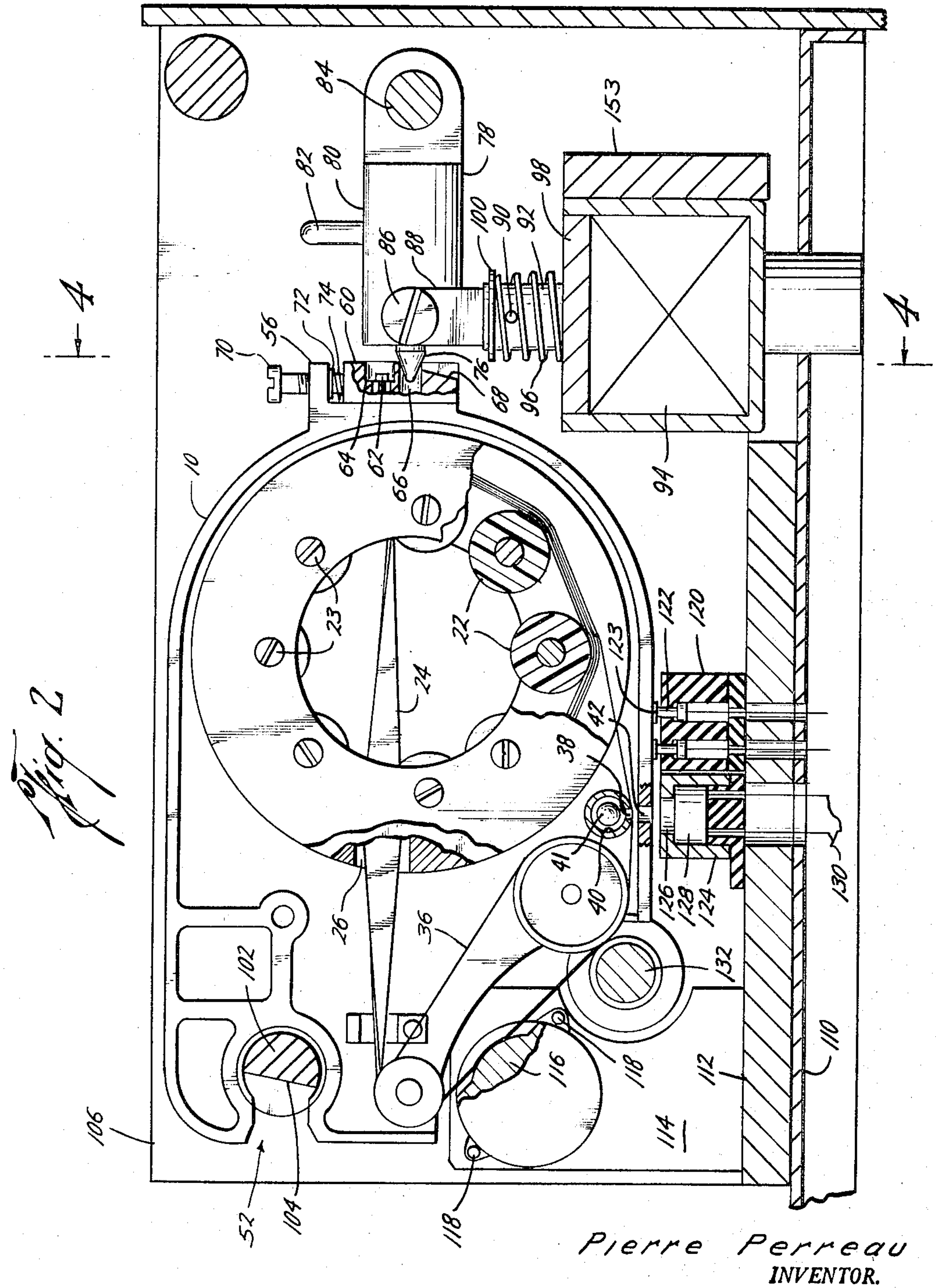
FIGURE 2 is a side view, partly in cross section, taken along line 2—2 in FIGURE 1.
Figure 3:
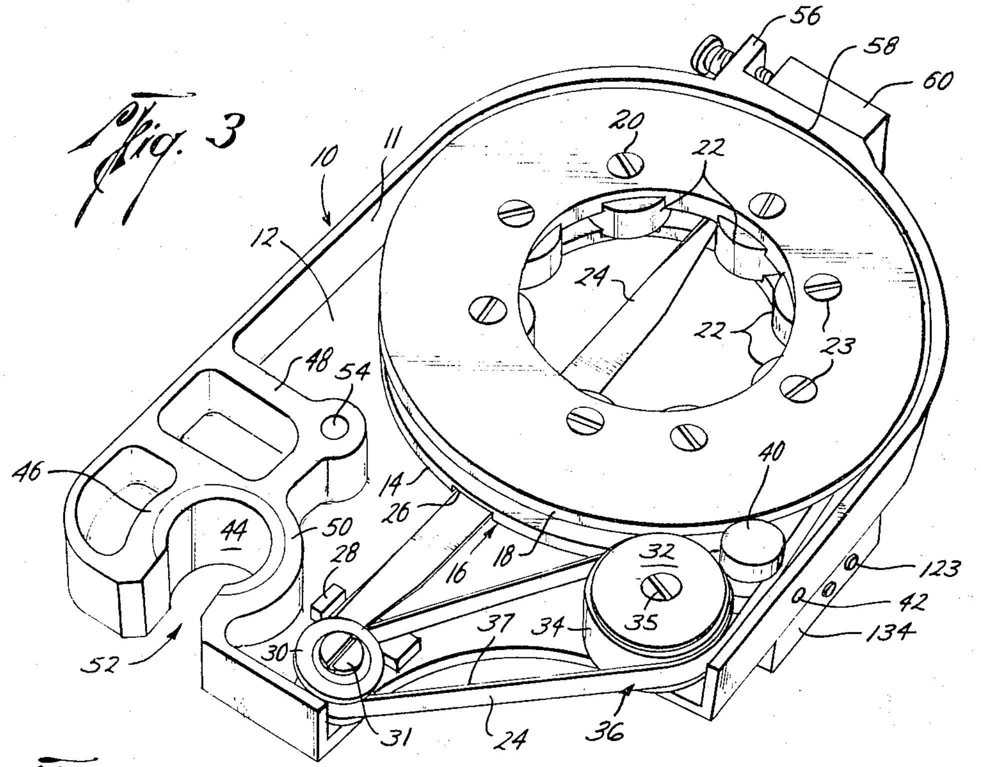
FIGURE 3 is an isometric view of a magnetic cassette shown in FIGURE 2.

As shown at FIG. 1, extraction stem 82 is fixed to finger 76 (FIG. 2), and, hence, manually moving stem 82 to the right, as viewed at FIG. 2, retracts finger 76 to permit removal of the cassette from the chassis.

To use one of the five decks or recordings placed on the chassis 108, the control button 154 is pressed which results in the energization of its corresponding electromagnet 94. The electromagnet pulls its head 92 downwardly and through the connection 88 rotates the swinging arm 78 about the shaft 84 in a counterclockwise direction. Through the tip of the conical finger 76, the motion of the pivoting arm 78 is transmitted to the casing 10 which makes it rotate clockwise very slightly about the pivot shaft 102. This is the operative position of casing 10. The rotation of the casing 10 is sufficient to allow for a frictional engagement between the driving roller 32 and the driving shaft 132. The rotation of shaft 132 imparts a rotation to roller 32 which causes the idle roller 30 to rotate and the tape 24 to advance at a constant speed. The energization of the electromagnet 94 brings, therefore, the portion of the magnetic tape 24 on the run 37 of the belt 36 into contact in a free manner with the magnetic playback head 116.

By means of the screw 70, during a preliminary adjustment, the pressure of the driving shaft 132 against the driven roller 32 may be adjusted. In fact, the rotation of the screw 70 slightly displaces the plate 60 and, therefore, the position of the notch 66. Because of the easy preliminary adjustment, the parts need not be manufactured with rigorous tolerances. After the preliminary adjustment, plate 60 is secured by tightening the screws 62.

In the operating position of casing 10, i.e., after the electromagnet 94 becomes energized, the tape 24 is in contact with the run 37 and travels therewith at a constant speed in front of the playback head 116. It should be noted that because of the torque exerted by the driving shaft 132 and the support provided by the strip 37 of the driving belt 36, the portion of the tape in front of the playback head is under tension. Consequently, the playback (or the recording) takes place under the most desirable conditions. When the magnetic tape 24 completes its run, the playback of the recording becomes terminated as a result of the passage of the transparent portion on the tape 24 in front of the window 38. When the transparent portion passes in front of the window 38, the small electric lamp 41 illuminates the cell 128 causing the generation of a voltage or current (or a change in resistance). This voltage or current causes the holding circuit 158 of the control relay 156 to open thereby resulting in the deenergization of the electromagnet 94. Under the action of the spring 96, the head 92 becomes raised and the arm 78 rotated about its shaft 84. The slight rotation of the finger 76 on the arm 78 in a clockwise direction makes the casing 10 rotate in a counterclockwise direction about pivot 102. Hence, the drum 34 on the driven roller 32 becomes disengaged from the shaft 132 and the driving of the tape 24 ceases.

The same action could have been obtained by actuating the control circuit 160. When it is desired to change the first magnetic deck, the extraction stem 82 is operated causing the finger 76 to withdraw from its corresponding notch 66. It is then sufficient to rock the casing 10*a* about the pivot 102 until the opening 52 becomes lined up with the flat surface 104 on the pivot 102. The casing 10*a* is then in position to be drawn out by the operator as shown in FIG. 6. It will be appreciated that the withdrawal of casing 10 can be performed very rapidly. After removal of one deck, one can proceed with its replacement by another deck. It will be also appreciated that the equipment in accordance with the present invention lends itself very readily to the simultaneous use of all decks, inasmuch as the control system for each deck is independent of each other deck. In addition, recording heads can be used instead of playback heads. Furthermore, various automatic programmings may be provided for operating selectively or simultaneously one or more of the decks. For example, one deck may become operative only after the disengagement of another deck.

Although a preferred embodiment of this invention has been disclosed and described in great detail, it will be understood that modifications thereof may be made within the true spirit and scope of the invention as recited in the following claims.

I claim:

1. A recording and reproducing apparatus comprising a chassis, a driving shaft rotatably mounted in said chassis; means driving said shaft at a constant speed; a pivot on said chassis; at least one magnetic cassette having a casing; said casing having an eye, said eye engaging said pivot to pivotally mount said cassette on said chassis; an idle roller and a driven roller driven by said driving shaft; means mounting said rollers on said casing for rotation about a fixed axis on said casing; tape storage means carried by said casing; a magnetic tape in said storage means, said tape having a portion extending around said idle roller and said driven roller; at least one magnetic head mounted on said chassis adjacent to and opposite said portion of said tape and engageable with a surface of said portion of the tape; actuating means on said chassis; connecting means connecting said cassette to said actuating means; said cassette being movable about said pivot from an inactive position in which said tape is spaced from said magnetic head and said driving shaft is disengaged from said driven roller to an active position in which said surface of said tape is engaged by said magnetic head and said driving shaft drivingly engages said driven roller; said connecting means comprising an engaging device on said casing, and a coupling assembly on said chassis; said engaging device having a notch preceded by an access ramp; means adjustably mounting said engaging device on said casing in opposed relation to said coupling assembly; said coupling assembly including a body and a latch finger mounted on said body for movement therewith; means resiliently urging said latch finger into said notch; means mounting said body for movement from a first position in which said casing is maintained in said inactive position by said finger, to a second position in which said casing is maintained in said active position, by said finger; operating means to operate said actuating means to move said body from one of said positions to the other; and cooperating means on at least one of said eye and said pivot to permit disengaging said casing from said pivot upon pivotal movement of the casing to a predetermined position.

2. Recording and reproducing apparatus according to claim 1 wherein: said means mounting said body for movement from said first position to said record position mounts said body for pivotal movement about an axis fixed relative to said chassis.

3. Recording and reproducing apparatus according to claim 1 which further includes a light responsive device; a light source spaced from said light responsive device; and means directing light from said source to said light responsive device along a predetermined path; said magnetic tape being opaque and passing through said path to normally interrupt the passage of light to said light responsive device; said tape including a short transparent portion which permits passage of light to said light responsive device; said light responsive device operating to actuate said operating means in response to light from said source passing through the transparent portion of said tape.

4. Recording and reproducing apparatus according to claim 1 wherein: said means driving said driving shaft at a constant speed is a synchronous electric drive motor on said chassis.

5. A recording reproducing apparatus comprising: a chassis; a pivot shaft on said chassis having an axis and having a plurality of flats formed thereon; a plurality of magnetic cassettes each having a casing; means on each cassette casing cooperating with said pivot shaft to pivotally mount said cassettes in side by side realtion for movement each in a single plane transverse to said axis from a first position in which said cassettes can be disengaged from said pivot shaft and removed from said chassis by movement of said cassettes in said single planes, to a second position, and to a third position; said means on each cassette including an eye having an opening narrower than the diameter of said shaft but of sufficient width to be passed over one of said flats of said pivot shaft when said cassette is in said first position; storage means carried by each casing; a magnetic tape in each storage means; driven means on each casing engaging said tape; a portion of said tape of each casing being exposed relative to said casing; a plurality of actuating means mounted on said chassis; a plurality of casing engaging means mounted one on each of said actuating means to engage respective ones of said cassettes in said second position and prevent movement of the cassettes from said second position to said first position; a plurality of recording heads mounted on said chassis, said recording heads engaging said exposed portions of said tape upon movement of said cassettes to said third position; means operating said actuating means to selectively move selected ones of said cassettes from said second position to said third position; driving means mounted in said chassis; means driving said driving means at a constant speed; said driving means engaging said driven means on said casings upon movement of said cassettes to said third position.

6. Recording and reproducing apparatus according to claim 5 which further includes: plurality of manually operable means one on each of said actuating means to release said casing engaging means from engagement with said casing, whereby manual operation of one of said means releases a cassette for movement to said first position in which the cassette can be removed from the chassis.

References Cited

UNITED STATES PATENTS

| | | | |
|---|---|---|---|
| 1,105,036 | 7/1914 | Mukautz | 226—172 XR |
| 2,683,568 | 7/1954 | Lindsay | 179—100.2 |
| 2,899,507 | 8/1959 | Martel | 179—100.2 |
| 2,971,716 | 2/1961 | Sampson | 179—100.2 |
| 2,982,489 | 5/1961 | Horres | 179—100.2 |
| 3,126,162 | 3/1964 | MacKenzie | 242—55.19 |
| 3,154,308 | 10/1964 | Faulkner | 274—4 XR |
| 3,247,328 | 4/1966 | Mitchell et al. | 179—100.2 |

LEONARD FORMAN, *Primary Examiner.*

JOEL FREED, *Assistant Examiner.*